United States Patent [19]

Muir

[11] Patent Number: 4,647,387
[45] Date of Patent: Mar. 3, 1987

[54] SUCCINIC ANHYDRIDE PROMOTER OVERBASED MAGNESIUM SULFONATES AND OILS CONTAINING SAME

[75] Inventor: Ronald J. Muir, Ontario, Canada

[73] Assignee: Witco Chemical Corp., New York, N.Y.

[21] Appl. No.: 722,058

[22] Filed: Apr. 11, 1985

[51] Int. Cl.$^4$ .......................................... C10M 125/00
[52] U.S. Cl. ...................................... 252/25; 252/18; 252/33.2; 252/33.3
[58] Field of Search ...................... 252/25, 33.2, 33.3, 252/18

[56] References Cited

U.S. PATENT DOCUMENTS

| | | | |
|---|---|---|---|
| 3,451,931 | 6/1969 | Kahn et al. | 252/25 |
| 3,714,042 | 1/1973 | Greenough | 252/33.2 |
| 3,766,066 | 10/1973 | McMillen | 252/32.7 E |
| 3,853,774 | 12/1974 | Crocker | 252/25 |
| 3,865,737 | 2/1975 | Kemp | 252/33.4 |
| 3,965,017 | 6/1976 | Burnop et al. | 252/33.3 |
| 4,049,560 | 9/1977 | Dominey | 252/33.3 |
| 4,129,589 | 12/1978 | Eliades | 260/504 A |
| 4,192,758 | 3/1980 | Dickey et al. | 252/25 |
| 4,201,682 | 5/1980 | Sabol et al. | 252/25 |
| 4,225,446 | 9/1980 | Arnold et al. | 252/33.2 |
| 4,328,111 | 5/1982 | Watson et al. | 252/33.4 |

Primary Examiner—William R. Dixon, Jr.
Assistant Examiner—Margaret B. Medley
Attorney, Agent, or Firm—Morton Friedman; Marvin Feldman

[57] ABSTRACT

An engine or lubricating oil containing 0.03 to 0.3% by weight of a succinic anhydride promoter reaction product for a overbased magnesium sulfonate, based on the presence of 0.5% by weight of Mg metal in the oil, and wherein the weight of the reaction product is commensurately proportional to the weight of Mg metal in the oil, and which oil is a free of post sulfonate formation water-tolerance additives, nevertheless passes the rigorous Cummins water tolerance test. Copromoters such as a naphthenic acid and/or a salicylic acid may be employed.

29 Claims, No Drawings

SUCCINIC ANHYDRIDE PROMOTER OVERBASED MAGNESIUM SULFONATES AND OILS CONTAINING SAME

FIELD OF THE INVENTION

This invention relates to overbased magnesium sulfonates. Specifically this invention relates to oils containing overbased magnesium sulfonates which are highly water-tolerant.

BACKGROUND AND THE DISCUSSION OF THE PRIOR ART

Basic magnesium salts are primarily useful as additives for fuels and lubricants. In lubricants such as crankcase lubricating oils, the basic magnesium salts function as detergents and reduce wear mainly by neutralizing acidic products formed during combustion or from the oxidation of the oil components.

When utilized as lubricant additives, these basic magnesium salts are added to the lubricating oil in an amount sufficient to provide the required degree of protection. This is generally in the range which supplies 0.1 to 30% by weight of overbased sulfonate in the formulated oil.

Heretofore it was known to prepare overbased magnesium sulfonates using MgO processes. Generally, these processes used water and methanol as promoters and employed ammonia, ammonium salts, low molecular weight carboxylic acids or salts thereof, oil soluble organic acids including the naphthenics and carboxylics, amines, or amine salts of an acid as secondary promoters.

In U.S. Pat. No. 3,875,737, granted to Kemp and U.S. Pat. No. 4,148,740, granted to Cease et al., there is disclosed an overbased magnesium sulfonate process wherein ammonia or an ammonium compound is used as a promoter. This process required the costly removal of ammonium salts from the product and condensate streams.

In U.S. Pat. No. 4,129,589, granted to Eliades et al., there is disclosed another overbased magnesium sulfonate process which uses low molecular weight carboxylic acids or salts thereof, such as acetic acid as a promoter.

In U.S. Pat. No. 3,629,109, granted to Gergel et al., there is disclosed a multistage carbonation process for preparing an overbased magnesium sulfonate. Mixtures of overbased sulfonates and carboxylates may be formed by reacting a mixture of substantial quantities of sulfonic acids and oil soluble carboxylic acids, with water and alcohol promoters. In Example 24 of the Gergel et al. patent, it is proposed to add quantities of a high molecular weight succinic anhydride, such as polyisobutenyl succinic anhydride, to the product magnesium salt to improve oil solubility. These oil solubility additives were recognized as also improving water tolerance.

Oils containing overbased magnesium sulfonates were not sufficiently water tolerant and failed the Cummins water tolerance test. Specifically where the engine or lubricating oil contained a detergent amount of overbased magnesium sulfonate, such 0.1% to 2.5% Mg metal, the oil failed the Cummins test.

The prior art desired an oil containing an overbased magnesium sulfonate which passed the Cummins test, without the need to post-formation "fix" or "dope" the overbased magnesium sulfonate.

Now there is provided by the present invention an unfixed overbased magnesium sulfonate which when added to an engine or lubricating oil in limited amounts passes the Cummins test.

SUMMARY OF THE INVENTION

An engine or lubricating oil containing a detergent amount of an overbased magnesium sulfonate and being substantially free of post sulfonate formation additives, and passes the Cummins Test.

An engine or lubricating oil containing limited amounts 0.03 to 0.3% of a succinic anhydride reaction product for an overbased magnesium sulfonate based on the presence of 0.5% by weight of Mg metal in the oil, and wherein the weight of the reaction product is commensurately proportional to the weight of Mg metal in the oil, and which is substantially free of post-formation "dope" or "fix" additives, and passes the Cummins test.

The invention includes the process for preparing the overbased magnesium sulfonate as well as the resultant overbased magnesium sulfonate having a TBN of about 400 to 500.

A copromoter system of a succinic anhydride with naphthenic acid and/or salicylic acid is also within the contemplation of the invention.

DEFINITIONS

The terms "succinic anhydride reaction product" or "succinic anhydride promoter reaction product" as used hereinbefore and hereinafter throughout the abstract, specification and claims refer to the resultant product from a succinic anhydride or succinic anhydride derivative promoter used for forming the overbased magnesium sulfonate.

The term "DDSA" as used hereinbefore and hereinafter throughout the specification and claims refers to dodecenyl succinic anhydride.

The term "Cummins test" as used hereinbefore and hereinafter throughout the abstract, specification and claims, refers to the Fleetguard Water Tolerance Test - Procedure IV, which is as follows:

Equipment

1. Millipore pressure filtration apparatus with 340 ml stainless steel barrel. (47 mm filter) Cat. No. XX4004740.
2. Nitrogen cylinder with pressure reducer adjusted to 25 psi or a source of clean, dry compressed air.
3. Graduated cylinder (min. 250 ml) with 10 or 20 ml graduations.
4. Forced draft oven capable of maintaining 70°±2° C.
5. Red Devil Paint Conditioner with automatic timer.
6. One pint wide mouth bottles and foil lined caps (O'-Berk Industries, Linden, N.J., Stock #1716).
7. Balance capable of weighing 0.1 g for weighing oil.
8. Analytical balance capable of weighing 0.1 mg for weighing filter.
9. Stopwatch capable of timing sequential events (Heathkit Model GB-1201, Microsplit 250 American Scientific Products of equivalent).

Materials

1. One quart test oil
2. Distilled water
3. Cox 5.0 micrometer filter discs (47 mm diam. type NA 500)

4. Pentane or Hexane (reagent or distilled grade prefiltered to 1.0 micrometer)

PROCEDURE

Sample Preparation

1. Test oil: weigh 198 g of new oil to be tested and 2 g distilled water into one pint wide mouth bottle.
2. Cap tightly and place in Red Devil Paint Conditioner (shaker) for five minutes.
3. Place bottle in pre-heated oven (70° C.) for five hours.
4. Remove bottle from oven and store at room temperature 20°-25° C. for 90±2 hours prior to filtration.

Filtration Procedure

1. Weigh a Cox 5.0 micrometer filter disc to the nearest 0.1 mg. Record the weight obtained.
2. Place the tared filter in the filtration apparatus (Note 1) with "wire side" down.
3. Weigh 200 grams of the untreated new oil into a one pint wide mouth bottle and pour into the barrel of the filtration apparatus with the aid of a spatula or rubber policeman.
4. Place a clean graduated cylinder (250 ml min.) under the apparatus to collect the filtrate.
5. Secure the pressure source to the barrel of the filtration apparatus.
6. Apply 25 psi pressure to the apparatus (Note 2). Start the time when the first drop of filtrate reaches the bottom of the receiver.
7. Record the total time in seconds to filter 40 ml, 80 ml, 120 ml, 160 ml, 200 ml (refer Note 3). Proceed to filter the remainder of the oil through the disc. It is not necessary to time the flow of the remaining oil. If flow rates fall to 4 ml per minute or below, the test will be stopped and reported as a failure.
8. Do not remove filter disc.
9. Stir sample with a stainless steel spatula to lift any deposit from the bottom of the container, and then shake for 5 minutes in a Red Devil paint shaker.
10. Pour the 200 g of the treated oil from the pint bottle into the barrel of the filtration apparatus.
11. Repeat steps 4 through 7 (see Note 3).
12. Wash the filter disc with pentane or hexane (Note 4).
13. Weigh the filter disc to the nearest 0.1 mg. Calculate the filter weight gain.
14. Calculate percent change in flow time (Note 5).
15. Report: (1) flow time in seconds for both new and treated oils; (2) percent change in flow time; and (3) filter weight gain per amount of sample filtered.
16. Discard the filtrate. A portion of this may be stripped of water for analytical purposes.
17. Each time a candidate oil is run, both the good and bad reference oil will be run to help insure test data reliability.

Limits

The percent change of flow time will not exceed 100% T, nor will weight gain of the filter disc exceed 20 mg.

NOTE 1

The Cox 5.0 micrometer filter is a depth type filter which is designed to filter in one direction. Care should be used in determining the direction of filtration.

NOTE 2

The pressure regulator should be positioned immediately adjacent to the filtration apparatus to provide a realistic on-line pressure reading.

NOTE 3

Stop the filtration if 60 seconds lapse between a 4 ml increment. Report the filtration times obtained prior to stopping. Note the point at which the filtration was stopped along with the total time and the total ml collected.

NOTE 4

A suitable method of washing the filter involves three pentane washes as follows:
1. Remove the top of the filtration apparatus and wash down with 100 ml of pentane. Mount the base with barrel in a filter flask, connect a water aspirator as the source of vaccum, and draw the 100 ml of pentane through the filter disc.
2. Remove the filter holder base with filter and support screen intact. Apply vacuum and wash the filter along its outside edge with a gentle stream of pentane (50 ml) from a solvent wash bottle until visual signs of oil have disappeared.
3. Remove vacuum and place filter on a Wattman #40 filter disc. Wash the Cox 5.0 mm filter disc along its outside edge with a gentle stream of pentane (50 ml) from a solvent bottle. Allow the filter to air dry for one hour prior to weighing.

NOTE 5

To obtain percent change in flow time subtract the 160 ml flow time from the 200 ml flow time for both new and treated oils. These are final flow times. The percent change in flow time can then be obtained using the following equation:

Percent change in flow time $= (b-a/a) \times 100$ where
$a = $ final new oil flow time
$b = $ final treated oil flow time

DESCRIPTION OF THE PREFERRED EMBODIMENTS

In one broad aspect, the present invention is an oil comprising;
 (a) an engine or lubricating oil; and
 (b) an overbased magnesium sulfonate, said oil being substantially free of post sulfonate formation water-tolerance additives; and wherein the oil passes the Cummins test.

The engine oil or lubricating oil further comprises 0.03 to 0.3% by weight of a succinic anhydride promoter reaction product based on the presence of 0.5% by weight of Mg metal in the oil, and wherein the weight of said reaction product is commensurately proportional to the weight of Mg metal in the oil. The amount of Mg metal in the oil may vary from 0.1 to 2.5% by weight and commensurately the weight of the succinic anhydride reaction product may vary from 0.006 to 1.5% by weight by the oil.

In a second broad aspect, the present invention is an overbased magnesium sulfonate product comprising;
 an overbased magnesium sulfonate containing 0.5 to 5.0% by weight of a succinic anhydride promoter reaction product, and wherein the product when added to an engine or lubricating oil, the oil passes the Cummins test.

In a third broad aspect, the present invention is a method of preparing an overbased magnesium sulfonate comprising;

adding a sulfonic acid, magnesium oxide, water, alcohol, and a first promoter being a succinic anhydride or succinic anhydride derivative; and desirably, a second promoter comprising a water soluble aromatic carboxylic acid such as a salicylic acid alone or in combination with a naphthenic acid, and adding an acidic gas.

It has been found that the total amount of succinic anhydride or succinic anhydride derivative required as a promoter or copromoter in the carbonating mixture is 0.5 to 5.0% by weight, and preferably 1.5 to 3.0% by weight. In certain cases it may be desirable to add limited amounts of the succinic anhydride or derivative as a post formation "fix", but in no event does the total amount of succinic anhydride reaction product and post formation succinic anhydride "fix" ever need exceed 5.0% by weight, and generally this total amount is 0.5 to 5.0 % by weight based on the weight of sulfonate product. Where no succinic anhydride promoter or copromoter is employed, it has been found that at least about 2.0 to 5.0% by weight of the succinic anhydride post formation "fix" is required to be added to a magnesium sulfonate at 200° F. to 400° F. to achieve a product which passes the Cummins test.

In preparing the carbonation mixture for forming the overbased magnesium sulfonate, the amount of succinic anhydride or derivative may be about 0.5 to 5.0% by weight of the finished overbased magnesium sulfonate and with a copromoter preferably about 1.5 to 3.0% by weight; the water soluble aromatic carboxylic acid (e.g. salicylic acid) may be about 0.05 to 0.5%, and preferably 0.1 to 0.3% by weight; and the naphthenic acid may be present in about 0.3 to 2.0% and preferably about 0.5 to 1.0% by weight.

It is important to note that the formed magnesium sulfonate has a TBN in excess of 400 and up to 500 or more, and wherein the succinic anhydride reaction product is in the aforesaid 0.5 to 5.0% by weight range.

While up to 5.0% by weight of the succinic anhydride may be added to the carbonation reaction mixture to achieve a overbased magnesium sulfonate which passes the Cummins test without post formation fix, it is understood that this level of water tolerance may be achieved with as low as 0.5 to 3.0% by weight.

Preferred succinic anhydrides useful as promoters and copromoters in the present invention include by way of example, alkyl and alkenyl succinic anhydrides, and preferrably the alkenyl succinic anhydrides, such as DDSA, tetradecenyl succinic anhydride, n-octenyl-S-anhydride, nonenyl-S-anhydride, and the like. Suitable succinic anydride derivatives include the acids, esters, half-esters, double-esters, and other hydrolyzable derivatives. While succinic anhydrides having organic radicals of up to about $C_{70}$ may be useful, it is preferred that the organic radical of the succinic anhydride or derivative be $C_6$-$C_{20}$, and most preferrably $C_8$-$C_{18}$. The most preferred succinic anhydride is DDSA. Without wishing to be bound by any theory or mechanism, it is believed that high molecular weight succinic anhydrides, such as above $C_{20}$, will exhibit reduced promoter activity, and therefore generally are not preferred.

Naphthenic acids when present in the reaction mixture promote the incorporation of the acidic material. These acids are a well-known class of compounds derived from petroleum straight run distillates, generally kerosene and gas oil. Caustic soda scrubbing of these materials followed by acidification of the resulting sodium naphthenate solution yields the acids. Acidification is generally accomplished with sulfuric acid. The supernatant crude naphthenic acids are obtained by decantation and may be purified by distillation, if desired. In addition, naphtha washing of the sodium naphthenate solution can be performed to decrease the hydrocarbon oil content of the finished acids.

Naphthenic acids are a mixture of compounds. They include cycloalkyl carboxylic acids substituted with one or more predominantly hydrocarbyl substituents. The cycloalkyl groups usually contain five or six carbon atoms. Each cycloaliphatic ring is substituted with one or more carboxylic acid groups. The only restriction on the hydrocarbyl substituents on the cycloaliphatic ring is that they contain a sufficient number of carbon atoms to make the naphthenic acids oil soluble. This will generally range from about four to about 40 carbon atoms.

Naphthenic acids also include noncyclic aliphatic acids. In these, the aliphatic moiety contains sufficient carbon atoms to make the molecule oil soluble. In general, they will contain at least 11 carbon atoms and more, usually 15 carbon atoms up to about 40 carbon atoms.

Also within the contemplation of this invention are the aromatic and substituted aromatic carboxylic acids including by way of example benzoic, salicylic, alkyl-salicylic, tropic, phthalic and divaric acid. Most preferred is the water soluble salicylic acid alone or most preferably in combination with naphthenic acid. That is the combination of the water soluble aromatic acid with the oil soluble napthenic acid has been found to be an effective copromoter for the succinic anhydride, particularly with regards to maintaining minimum post carbonation sediment (PCS) and a high total base number (TBN) in excess of 400, and generally 400-450.

Sulfonic acids suitably used in accordance with this invention are preferably oil-soluble sulfonic acids. Such sulfonic acids include preferentially oil-soluble petroleum sulfonic acids, commonly referred to as "mahogany acids," alkyl sulfonic acids, aryl sulfonic acids, and alkaryl sulfonic acids. Illustrative of suitable sulfonic acids are the preferentially oil-soluble petroleum sulfonic acids, e.g., "mahogany acids" of about 350 to 750 molecular weight, dilauryl aryl sulfonic acid, lauryl-cetyl aryl sulfonic acid, paraffin wax-substituted benzene sulfonic acids, didodecyl benzene sulfonic acids, polyolefin alkylated benezene sulfonic acids, such as polybutylene alkylated benezene sulfonic acids, in which the polybutylene substituents have molecular weights of at least about 200, and preferably within the range of from about 300 to about 2500; polypropylene alkylated benezene sulfonic acids in which the polypropylene substituents have a molecular weight of at least about 250, and preferably within the range of from about 290 to about 1500; naphthalene sulfonic acids; alkyl-substituted naphthalene sulfonic acids; and the like.

The preparation of the sulfonic acid is well-known to those skilled in the art. Such sulfonic acids can be prepared by reacting the material to be sulfonated with a suitable sulfonating agent, such as concentrated sulfuric acid, fuming sulfuric acid, chlorosulfonic acid or sulfur trioxide for a period of time sufficient to effect sulfonation, and thereafter separating insoluble acid sludge from the oil-soluble sulfonic acid.

The type of magnesium oxide used in a preferred embodiment of the process is the light or active form. The amount of magnesium oxide used is dependent upon the metal ratio desired in the final product. The metal ratio is the ratio of the number of equivalents of magnesium in the overbased compound to the equivalents of sulphonic acid in the overbased compound. Therefore, to obtain a metal ratio of, for example, 30, there must be at least thirty equivalents of magnesium oxide per equivalent of sulphonic acid in the initial reaction mixture. It is apparent that when the reaction is carried out under less favorable conditions at lower efficiencies, an excess of magnesium oxide beyond that determined by the metal ratio should be used to ensure sufficient incorporation of magnesium within the structure of the overbased magnesium salt to the sulfonic acid.

The alcohols used in this process include lower aliphatic alkanols, alkoxy alkanols, and mixtures thereof, where the number of carbon atoms usually does not exceed 5. Examples of the alcohols include methanol, ethanol, isopropanol, n-propanol, butanol, and pentanol. The preferred alcohol is methanol because of the low cost and ease of removal from the reaction mixture. An example of a suitable alkoxy alkanol includes methoxy ethanol.

Several different types of volatile and non-volatile diluents may be used in this process. The non-volatile diluents are generally mineral or synthetic lubricating oils, such as lubricating oils having a viscosity around 100 SUS at 100° F. These can be aliphatic, aromatic, or a mixture of both types of solvents. For example, naphtha is a particularly useful diluent. Other types of suitable diluents include Stoddard solvent, cycloaliphatic and aromatic hydrocarbons, and corresponding halogenated hydrocarbons, such as chlorobenzene, and other conventional organic diluents generally employed in the overbasing procedures in this particular art of manufacture. The amount of diluent used is sufficient to lower the viscosity of the reaction mixture to facilitate mixing thereof during the introduction and contacting of the acidic gases with the mixture.

The length of time that the acidic gas is contacted with the reaction mixture depends upon the desired level of magnesium in the overbased magnesium sulphonate. The contacting of the gas with the mixture may be continued until no further gas is absorbed to indicate that substantially all of the magnesium oxide originally intoduced into the system has been reacted to form an overbased magnesium sulphonate. To determine when the absorption of the gas is complete, the flow rate of the acidic gas being introduced is compared to the flow rate of the gas leaving the system. When the flow rate of leaving gas almost equals the flow rate of the introduced gas, then the absorption is substantially complete.

In general the reaction of the present invention is carried out by mixing the sulfonic acid, generally a linear alkyl benzene sulfonic acid, with mineral oil and naphtha diluents (25 to 80% by weight of the carbonation mixture). Light magnesium oxide in a stoichiometric excess to react with the sulfonic acid is added to the solution, followed by the addition of water (0.3 mol–10 mol/mol MgO), alkanol (0.1 mol–4 mol/mol MgO), DDSA and naphthenic acid and/or salicylic acid (in amounts as afore-discussed). The mixture is stirred vigorously and heated to 100° to 145° F. and up to the reflux temperature of the mixture, whereupon $CO_2$ is bubbled slowly into the reaction mass. Carbonation is continued for 2–3 hours until the consumption of $CO_2$ is essentially complete. During carbonation additional amounts of water and methanol may be added.

At the conclusion of the reaction a portion of the crude mass is generally centrifuged to determine the percent by volume of unreacted solids reported as % post carbonation sediment (PCS). A portion of the mass is also used to determine total base number (TBN).

As can be appreciated by those skilled in the art, impurities and other variations in the selected feed stocks and magnesium oxides, according to this invention, can cause the resultant product to have slightly different results than that achieved in the following examples. These examples are intended to illustrate various aspects of the invention and are not intended to limit the scope of the invention in any way.

EXAMPLES

EXAMPLE 1–1A

The following carbonating mixture was prepared:

| component | parts by weight |
|---|---|
| sulfonic acid (100%) | 2690 |
| heptane | 4756 |
| magnesium oxide (light form) | 1950 |
| methanol | 407 |
| water | 472 |
| salicylic acid | 25 |
| DDSA | 63 |
| naphthenic acid | 63 |

The aforesaid mixture was carbonated under the following conditions:

| | |
|---|---|
| $CO_2$ (parts by weight) | 830/415/200 |
| rate (parts/min.) | 13.8/6.9/3.3 |
| time (hrs.) | 3 |
| temp (°F.) | 135–145 |

During carbonation an additional 944 parts water and 407 parts methanol was added. The resultant carbonate product (No.1) had a high TBN, which was diluted with 100 SUS viscosity oil to form a 400 TBN product (No.1A) with a resultant % PCS of 2%.

The products were subjected to the Cummins test with the following results:

| Example | Flow Change (%) | Weight Gain (mg) | Overall Test Results |
|---|---|---|---|
| 1 | 34 | 27[1] | passes |
| 1a | 2 | 15 | passes |

EXAMPLE 2

The following carbonating mixture was prepared:

| component | part by weight | % |
|---|---|---|
| sulfonic acid (100%) | 2690 | |
| heptane | 4756 | |
| magnesium oxide (light form) | 2000 | |
| methanol | 166 | |
| DDSA | 331 | 3% |
| neo-decanoic acid | 55 | .5% |

The aforesaid mixture was carbonated under the following conditions:

| | |
|---|---|
| CO$_2$ (parts by wt.) | 1323 |
| rate (parts/min.) | 11 |
| time (hrs.) | 2 |
| temp (°F.) | 98-134 |

During carbonation, 340 parts of additional methanol and 1450 parts of water were added. The resultant product was cut to 400 TBN, and subjected to the Cummins Test with the following test results:

| Example | Flow Change (%) | Weight Gain (mg) | Overall Test Results |
|---|---|---|---|
| 2 | 5 | 25[1] | passes |

[1] Compared to a test passing reference standard test oil which tested at 30 mg. weight gain.

EXAMPLES 3-6

Carbonating mixtures nos. 3-6 were prepared with various succinic anhydrides as the sole promoter. The overbased magnesium sulfonate reaction products were then subjected to the Cummins test with the following results:

| Example | 3 | 4 | 5 | 6 |
|---|---|---|---|---|
| Promotor | DDSA | tetradecenyl-succinic anhydride | n-octenyl S—anhydride | nonenyl S—anhydride |
| Promoter Level | 5% | 5% | 5% | 5% |
| Product Inspection | | | | |
| P.C.S. | 7.4 | 8.8 | 5.4 | 5.6 |
| TBN | 396 | 379 | 350 | 393 |
| Nephlos | 33 | 34 | 32 | 32 |
| Cummins Test | Pass | Pass | Pass | Pass |

In formulating a lubricating or engine oil conventional additives may be included, such as, a zinc dialkyldithiophosphate, viscosity index improvers such as poly methacrylates, ashless detergents such as polybutenyl succinimides, and the like. Thus, it is to be understood that lubricating compositions containing products prepared according to the process of the present invention may also contain conventional lubricating composition additives such as one or more antioxidants, corrosion inhibitors, detergents, dispersants, VI improvers, antiwear additives, extreme pressure additives, friction modifiers or any combination thereof.

What is claimed is:
1. An oil comprising;
 (a) an engine or lubricating oil comprising;
 (b) an overbased magnesium sulfonate having a TBN of at least 400; said sulfonate being present in a detergent amount, and said oil being substantially free of post sulfonate formation water-tolerance additives, and wherein the oil passes the Cummins Test.
2. The oil of claim 1, further comprising 0.03 to 0.3% by weight of a succinic anhydride promoter reaction product based on the presence of 0.5% by weight of Mg metal in the oil, and wherein the weight of said reaction product is commensurately proportional to the weight of Mg metal in the oil.
3. The oil of claim 1, further comprising a promoter reaction product being derived from an alkenyl succinic anhydride.
4. The oil of claim 3, wherein the alkenyl group is $C_6$-$C_{20}$.
5. The oil of claim 4, wherein the alkenyl group is $C_8$-$C_{18}$.
6. The oil of claim 2, wherein the succinic anhydride is DDSA.
7. The oil of claim 1, wherein the oil is a diesel oil.
8. The oil of claim 2, wherein the reaction product further comprises a co-promoter reaction product derived from a combination of an oil soluble naphthenic acid and a water soluble aromatic carboxylic acid.
9. An overbased magnesium sulfonate comprising, an overbased magnesium sulfonate having 0.5 to 5.0% by weight of $C_6$-$C_{20}$ anhydride promoter reaction product having a TBN in excess of about 400, wherein the product when added in a detergent amount to an engine or lubricating oil the resultant oil passes the Cummins Test.
10. The sulfonate of claim 9, said promoter reaction product being produced from an alkenyl succinic anhydride.
11. The sulfonate of claim 10, wherein the alkenyl group is $C_8$-$C_{18}$.
12. The sulfonate of claim 9, further comprising said oil, and wherein the oil is substantially free of postsulfonate formation water tolerance additives.
13. The sulfonate of claim 9, said reaction promoter product being the reaction product of a succinic anhydride promoter and a co-promoter being at least one selected from an oil soluble naphthenic acid and water soluble aromatic carboxylic acid.
14. The sulfonate of claim 13, wherein the composition is the combination of the naphthenic acid and the water soluble aromatic carboxylic acid.
15. The sulfonate of claim 9, said promoter reaction product being present in an amount of 1.5 to 3.0% by weight.
16. A method of preparing an overbased magnesium sulfonate comprising; adding an acidic gas to a mixture comprising a sulfonic acid, magnesium oxide, water, alcohol, and a first promoter comprising a $C_6$-$C_{20}$ succinic anhydride or derivative thereof and a co-promoter being one selected from naphthenic acid and a water soluble carboxylic acid, and wherein the water soluble carboxylic acid is present is an amount of 0.05 to 0.5% by weight and the naphthenic acid is present in an amount of 0.3 to 2.0% by weight.
17. The method of claim 16, wherein the first promoter is present in an amount of from 0.5 to 5.0 by weight.
18. The method of claim 16, wherein the first promoter is present in about 1.5 to 3.0%, % by weight.
19. The method of claim 16, wherein the reaction temperature is 100° to 145° F.
20. The method of claim 16, wherein the magnesium oxide is a light MgO.
21. The method of claim 16, wherein the second promoter is the combination of the naphthenic acid and the water soluble carboxylic acid.
22. The method of claim 21, wherein the water soluble carboxylic acid is salicylic acid.
23. The method of claim 16, wherein the first promoter is an alkenyl succinic anhydride.
24. The method of claim 16, wherein the succinic anhydride is DDSA.

25. The method of claim 16, wherein the water soluble carboxylic acid is salicylic acid.

26. A method of preparing an overbased magnesium sulfonate comprising; adding an acidic gas to a mixture comprising a sulfonic acid, magnesium oxide, water, alcohol, and a promoter comprising a $C_6$-$C_{20}$ succinic anhydride or derivtive thereof, said anhydride or derivative being present in an amount of 0.5 to 5.% by weight based on the weight of the overbased magnesium sulfonate product.

27. The method of claim 26, said succinic anhydride comprising an alkenyl succinic anhydride.

28. The method of claim 27, said succinic anhydride comprising DDSA.

29. The method of claim 26, said derivative being hydrolyzable.

* * * * *